(12) United States Patent
Bohme

(10) Patent No.: US 11,077,872 B2
(45) Date of Patent: Aug. 3, 2021

(54) SIGNAL LIGHT ASSEMBLY

(71) Applicant: Siemens Mobility, Inc., New York, NY (US)

(72) Inventor: Richard C. Bohme, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 17/056,955

(22) PCT Filed: Jun. 18, 2018

(86) PCT No.: PCT/US2018/038058
§ 371 (c)(1),
(2) Date: Nov. 19, 2020

(87) PCT Pub. No.: WO2019/245522
PCT Pub. Date: Dec. 26, 2019

(65) Prior Publication Data
US 2021/0206404 A1 Jul. 8, 2021

(51) Int. Cl.
F21V 21/00 (2006.01)
B61L 5/18 (2006.01)
(Continued)

(52) U.S. Cl.
CPC .......... B61L 5/1845 (2013.01); B61L 5/1836 (2013.01); G02B 3/08 (2013.01); G08G 1/095 (2013.01);
(Continued)

(58) Field of Classification Search
CPC .... B61L 5/1845; B61L 5/1854; B61L 5/1836; G02B 5/1876; G02B 3/08; G08G 1/095;
(Continued)

(56) References Cited

U.S. PATENT DOCUMENTS 7,581,854 B2* 9/2009 Ford .................... F21V 23/0442
362/311.02
2015/0204491 A1* 7/2015 Yuan ....................... F21V 5/045
362/311.02
2019/0329803 A1* 10/2019 Beier ........................ B61L 9/04

FOREIGN PATENT DOCUMENTS

CH 699414 A2 2/2010
GB 2495120 A 4/2013

OTHER PUBLICATIONS

PCT International Search Report and Written Opinion of International Searching Authority dated Mar. 28, 2019 mrresponding to PCT International Application No. PCT/US2018/038058 filed Jun. 18, 2018.

* cited by examiner

Primary Examiner — Laura K Tso

(57) ABSTRACT

A signal light assembly is provided that comprises a multi-position Fresnel lens having a circumference, a first side and a second side. The signal light assembly further comprises a main housing configured to attach to the multi-position Fresnel lens. The multi-position Fresnel lens includes a first plurality of pads and a second plurality of pads on the first side of the multi-position Fresnel lens such that the first plurality of pads and the second plurality of pads are different and alternatively disposed. The first plurality of pads corresponds to a first range operation related to a first focal length. The second plurality of pads corresponds to a second range operation related to a second focal length. The multi-position Fresnel lens is disposed in a first position corresponding to the first range operation or in a second position corresponding to the second range operation based on the use of either the first plurality of pads or the second plurality of pads for assembly between the main housing and the multi-position Fresnel lens.

20 Claims, 9 Drawing Sheets

(51) Int. Cl.
  *G08G 1/095* (2006.01)
  *G02B 3/08* (2006.01)
  *G02B 5/18* (2006.01)
  *F21V 5/04* (2006.01)
  *F21V 5/08* (2006.01)
  *F21V 17/02* (2006.01)
  *F21V 17/00* (2006.01)

(52) U.S. Cl.
  CPC ............... *B61L 5/1854* (2013.01); *F21V 5/04* (2013.01); *F21V 5/045* (2013.01); *F21V 5/08* (2013.01); *F21V 17/005* (2013.01); *F21V 17/02* (2013.01); *G02B 5/1876* (2013.01)

(58) Field of Classification Search
  CPC ... F21V 5/04; F21V 5/08; F21V 5/045; F21V 17/005; F21V 17/02
  USPC .......................................... 362/277, 326, 308
  See application file for complete search history.

DETAIL A

VIEW B-B

DETAIL C

VIEW F-F

VIEW K-K

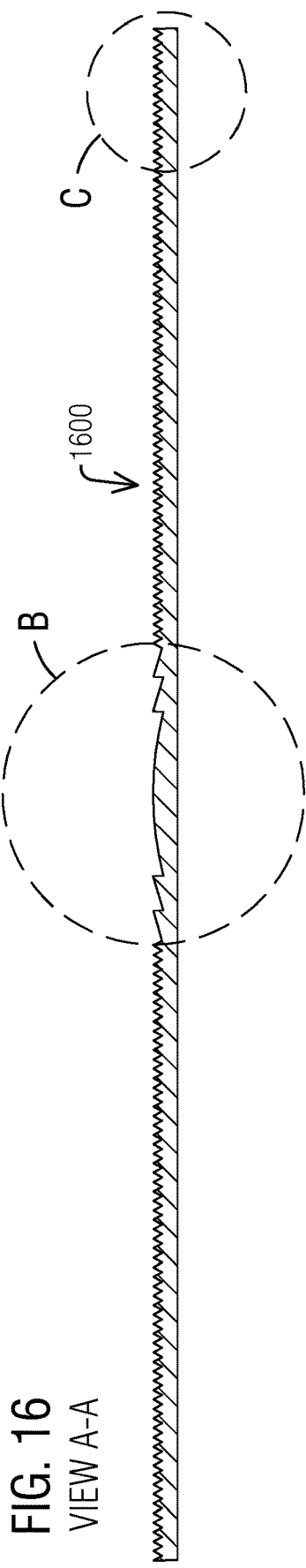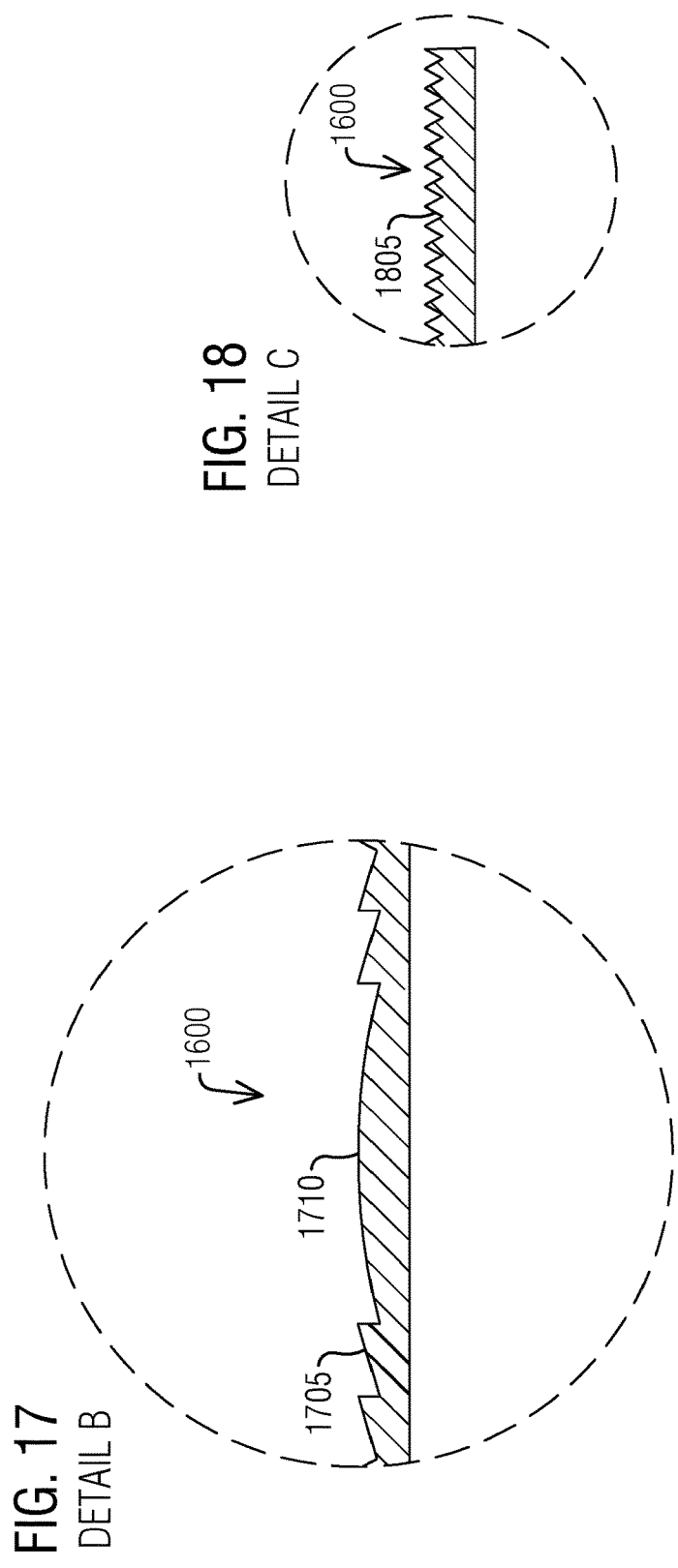
FIG. 16
VIEW A-A
FIG. 17
DETAIL B
FIG. 18
DETAIL C

SIGNAL LIGHT ASSEMBLY

BACKGROUND

1. Field

Aspects of the present invention generally relate to a signal light assembly more particularly to wayside color lighting for railway signaling systems based on a Fresnel lens.

2. Description of the Related Art

Train control systems may use pulsed currents through a track circuit to communicate allowable speed information and employ wayside signaling, which allows a quick response to changing traffic information. All the elements which make up the wayside signaling infrastructure play a vital role in system optimization and passenger safety.

Along a railway track, a train control system provides a backbone network infrastructure serving the equipment for a railway signaling system, for example the switches for the base transceiver stations (BTSs) or the fiber optic cables. This network can also be used for the operation of systems related to signaling such as Supervisory control and data acquisition (SCADA) controls and security. Supervisory control and data acquisition (SCADA) is a system of software and hardware elements that allows a railway company to control railway systems locally or at remote locations.

Wayside signaling also employs color signal lights. Color signal lights have an optical module which includes both inner and outer doublet lenses, as well as a pre-focused lamp and a socket. An optical module assembly of a color signal light is built with a precision die cast aluminum body and lamp mounting.

Typical wayside color signal lights are for mid and long range distances. A problem is encountered in that one needs two different die cast aluminum housings to achieve two different focal lengths for positioning a Fresnel lens.

Therefore, there is a need for a single wayside color signal light that can work for both mid and long range distances as needed.

SUMMARY

Briefly described, aspects of the present invention relate to a single wayside color signal light that is configurable at the time of assembly to function either one of the mid or long range distances based on a desired configuration of installment of a Fresnel lens. The Fresnel lens is configured to be selectively assembled in one position or another position to enable two different range distances. With such a dual position Fresnel lens, there would be no need for two different die cast aluminum housings to achieve two different focal lengths for positioning the Fresnel lens.

In accordance with one illustrative embodiment of the present invention, a signal light assembly comprises a multi-position Fresnel lens having a circumference, a first side and a second side. The signal light assembly further comprises a main housing configured to attach to the multi-position Fresnel lens. The multi-position Fresnel lens includes a first plurality of pads and a second plurality of pads on the first side of the multi-position Fresnel lens such that the first plurality of pads and the second plurality of pads are different and alternatively disposed. The first plurality of pads corresponds to a first range operation related to a first focal length. The second plurality of pads corresponds to a second range operation related to a second focal length. The multi-position Fresnel lens is disposed in a first position corresponding to the first range operation or in a second position corresponding to the second range operation based on the use of either the first plurality of pads or the second plurality of pads for assembly between the main housing and the multi-position Fresnel lens.

In accordance with one illustrative embodiment of the present invention, a wayside signal light comprises a signal light assembly that includes a multi-position Fresnel lens having a circumference, a first side and a second side. The signal light assembly further comprises a main housing having an inner surface. The multi-position Fresnel lens includes near the circumference a first plurality of flat pads and a second plurality of raised pads on the first side of the multi-position Fresnel lens such that a height differential between the first plurality of flat pads and the second plurality of raised pads corresponds to a first range operation related to a first focal length or to a second range operation related to a second focal length. The main housing is configured to attach to the multi-position Fresnel lens via the first plurality of flat pads or the second plurality of raised pads. The inner surface of the main housing includes a plurality of bosses configured to receive corresponding screws through either the first plurality of flat pads or the second plurality of raised pads such that the multi-position Fresnel lens is used for a first position corresponding to the first range operation or for a second position corresponding to the second range operation based on the use of either the first plurality of flat pads or the second plurality of raised pads for assembly between the main housing and the multi-position Fresnel lens.

In accordance with another illustrative embodiment of the present invention, a method for configuring a signal light assembly. The method comprises providing a multi-position Fresnel lens having a circumference, a first side and a second side. The multi-position Fresnel lens includes near the circumference a first plurality of flat pads and a second plurality of raised pads on the first side of the multi-position Fresnel lens such that a height differential between the first plurality of flat pads and the second plurality of raised pads corresponds to a first range operation related to a first focal length or to a second range operation related to a second focal length. The method further comprises providing a main housing having an inner surface. The main housing is configured to attach to the multi-position Fresnel lens via the first plurality of flat pads or the second plurality of raised pads. The inner surface of the main housing includes a plurality of bosses configured to receive corresponding screws through either the first plurality of flat pads or the second plurality of raised pads such that the multi-position Fresnel lens is used in a first position corresponding to the first range operation or in a second position corresponding to the second range operation based on the use of either the first plurality of flat pads or the second plurality of raised pads for assembly between the main housing and the multi-position Fresnel lens. The method further comprises, during assembly of the signal light assembly, providing the multi-position Fresnel lens as one common Fresnel lens for mid and long range units by rotating the multi-position Fresnel lens to rest in the main housing as a common housing either on the first plurality of flat pads that is short spacers or the second plurality of raised pads that is long spacers effectively changing a focal length being a distance between the multi-position Fresnel lens and a LED light source.

BRIEF DESCRIPTION OF THE DRAWINGS

FIG. 16 schematically represents a side view of a Fresnel lens of a wayside signal light consistent with an exemplary embodiment of the present invention.

FIG. 17 depicts a representation of a partial zoomed-in view of a Fresnel lens of a wayside signal light shown in FIG. 16 for detail B consistent with an illustrative embodiment of the present invention.

FIG. 18 depicts a representation of a partial zoomed-in view of a Fresnel lens of a wayside signal light shown in FIG. 16 for detail C consistent with an illustrative embodiment of the present invention.

DETAILED DESCRIPTION

To facilitate an understanding of embodiments, principles, and features of the present invention, they are explained hereinafter with reference to implementation in illustrative embodiments. In particular, they are described in the context of a wayside color lighting assembly for railway wayside signaling systems based on a configurable Fresnel lens. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

A signal light assembly is provided that comprises a multi-position Fresnel lens having a circumference, a first side and a second side. The signal light assembly further comprises a main housing configured to attach to the multi-position Fresnel lens. The multi-position Fresnel lens includes a first plurality of pads and a second plurality of pads on the first side of the multi-position Fresnel lens such that the first plurality of pads and the second plurality of pads are different and alternatively disposed. The first plurality of pads corresponds to a first range operation related to a first focal length. The second plurality of pads corresponds to a second range operation related to a second focal length. The multi-position Fresnel lens is disposed in a first position corresponding to the first range operation or in a second position corresponding to the second range operation based on the use of either the first plurality of pads or the second plurality of pads for assembly between the main housing and the multi-position Fresnel lens.

A wayside signal light is provided that comprises a signal light assembly including a multi-position Fresnel lens and a main housing. The multi-position Fresnel lens includes a first plurality of flat pads and a second plurality of raised pads on a side of the multi-position Fresnel lens such that a height differential between the first plurality of flat pads and the second plurality of raised pads corresponds to a first range operation related to a first focal length or to a second range operation related to a second focal length. The main housing configured to attach to the multi-position Fresnel lens via the first plurality of flat pads or the second plurality of raised pads. The multi-position Fresnel lens is used in a first position corresponding to the first range operation or in a second position corresponding to the second range operation based on the use of either the first plurality of flat pads or the second plurality of raised pads for assembly between the main housing and the multi-position Fresnel lens.

Figure 1:
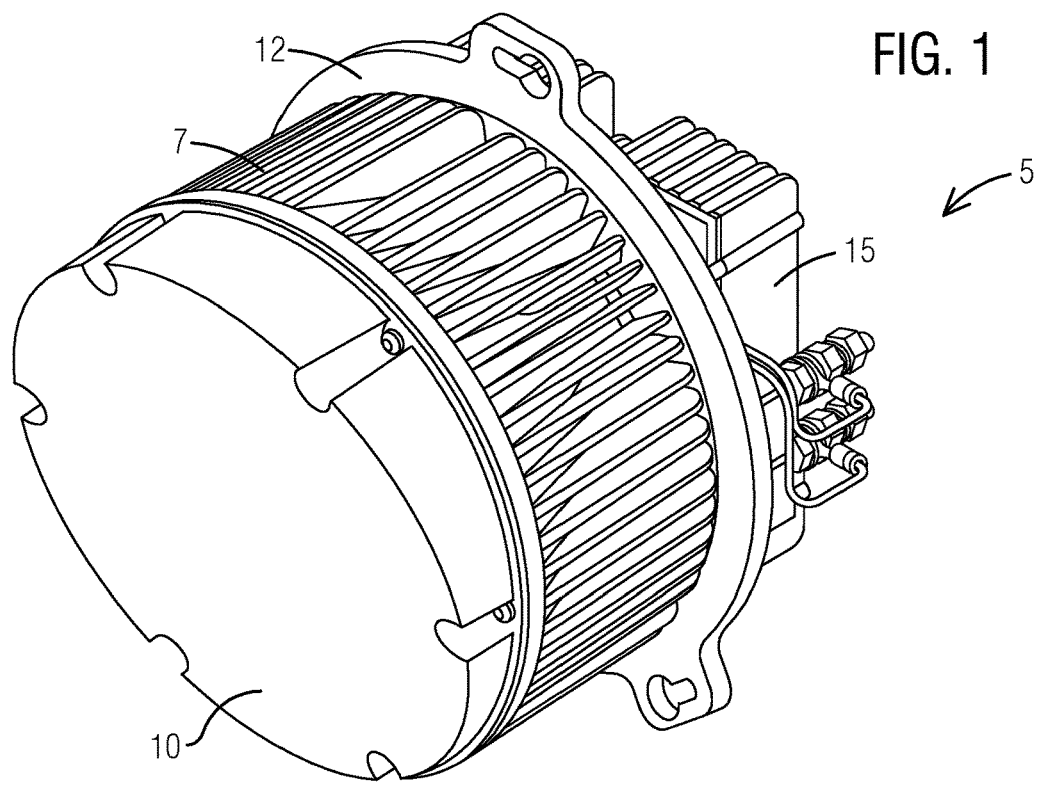
FIG. 1 illustrates a representation of a front view of a complete assembly of a wayside signal light in accordance with an exemplary embodiment of the present invention.

Consistent with one embodiment of the present invention, FIG. 1 represents a representation of a front view of a complete assembly of a wayside signal light 5 in accordance with an exemplary embodiment of the present invention. The wayside signal light 5 includes a main housing 7, a range specific cover 10, a thermal pad 12 and a heat sink 15. The wayside signal light 5 includes an optical module (not seen) which includes one or more lenses, as well as a pre-focused lamp (not seen) and a socket (not seen). The wayside signal light 5 includes an optical module assembly that is built with a precision die cast aluminum body and a lamp mounting. The wayside signal light 5 includes a configurable Fresnel lens (not seen).

The wayside signal light 5 may be configured for operating at mid and long range distances by using two different settings of the configurable Fresnel lens during assembly. The configurable Fresnel lens on both sides have standoffs or pads protruding—one set with no height and one set with some height. A proper positioning of the configurable Fresnel lens in the main housing 7 allows functionality for a chosen range distance. A height differential in heights of the two standoffs leads to this ability of operating at two different range distances. In this way, one does not need two different die cast aluminum housings to achieve two different focal lengths for positioning a Fresnel lens. A focal length of a Fresnel lens is herein defined as a lateral distance between a lamp such as a LED of the wayside signal light 5 and the Fresnel lens itself mounted in the main housing 7 of the wayside signal light 5.

Figure 2:
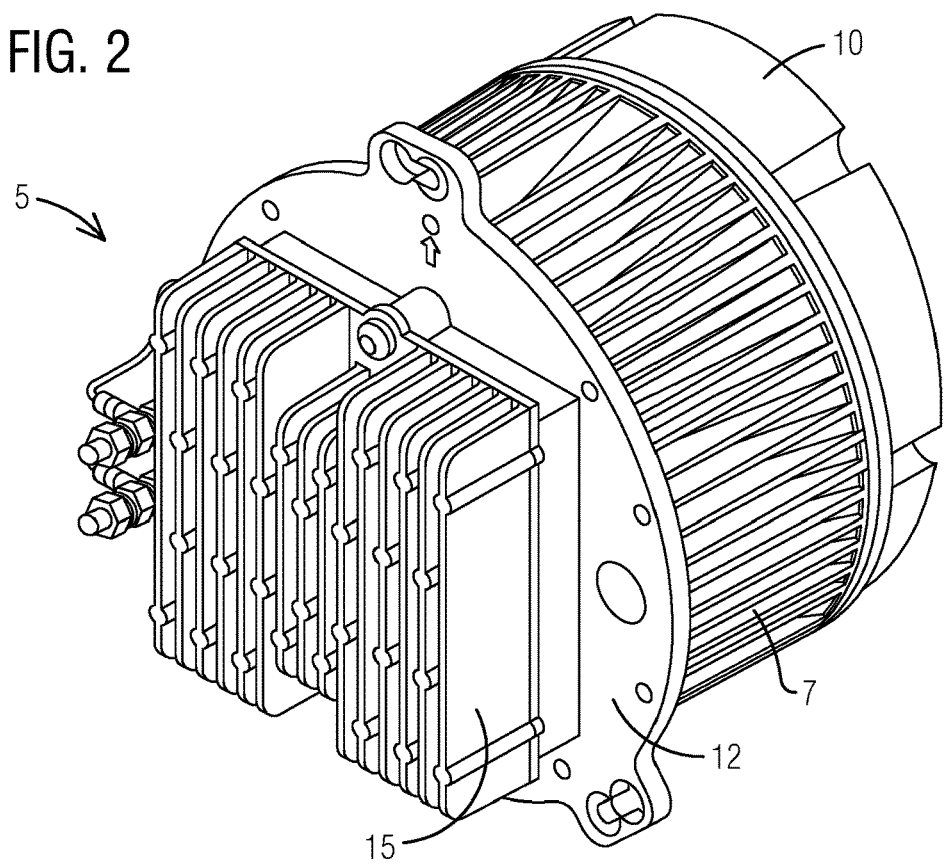
FIG. 2 illustrates a representation of a rear view of a complete assembly of the wayside signal light of FIG. 1 in accordance with an exemplary embodiment of the present invention.

Referring to FIG. 2, it illustrates a representation of a rear view of a complete assembly of the wayside signal light 5 of FIG. 1 in accordance with an exemplary embodiment of the present invention. This wayside signal light 5 solves the issue of having two different focal lengths (mid and long range) without creating different housings and or parts. The Fresnel lens is mounted with (6) equally spaced screws. The lens is designed with (12) equally spaced screw mounting positions such that (6) of the positions have a molded in long spacer and the other (6) have a molded in short spacer. If looking radially at the edge of the Fresnel lens, it has alternating spacers, long, short, long short etc.

Figure 3:
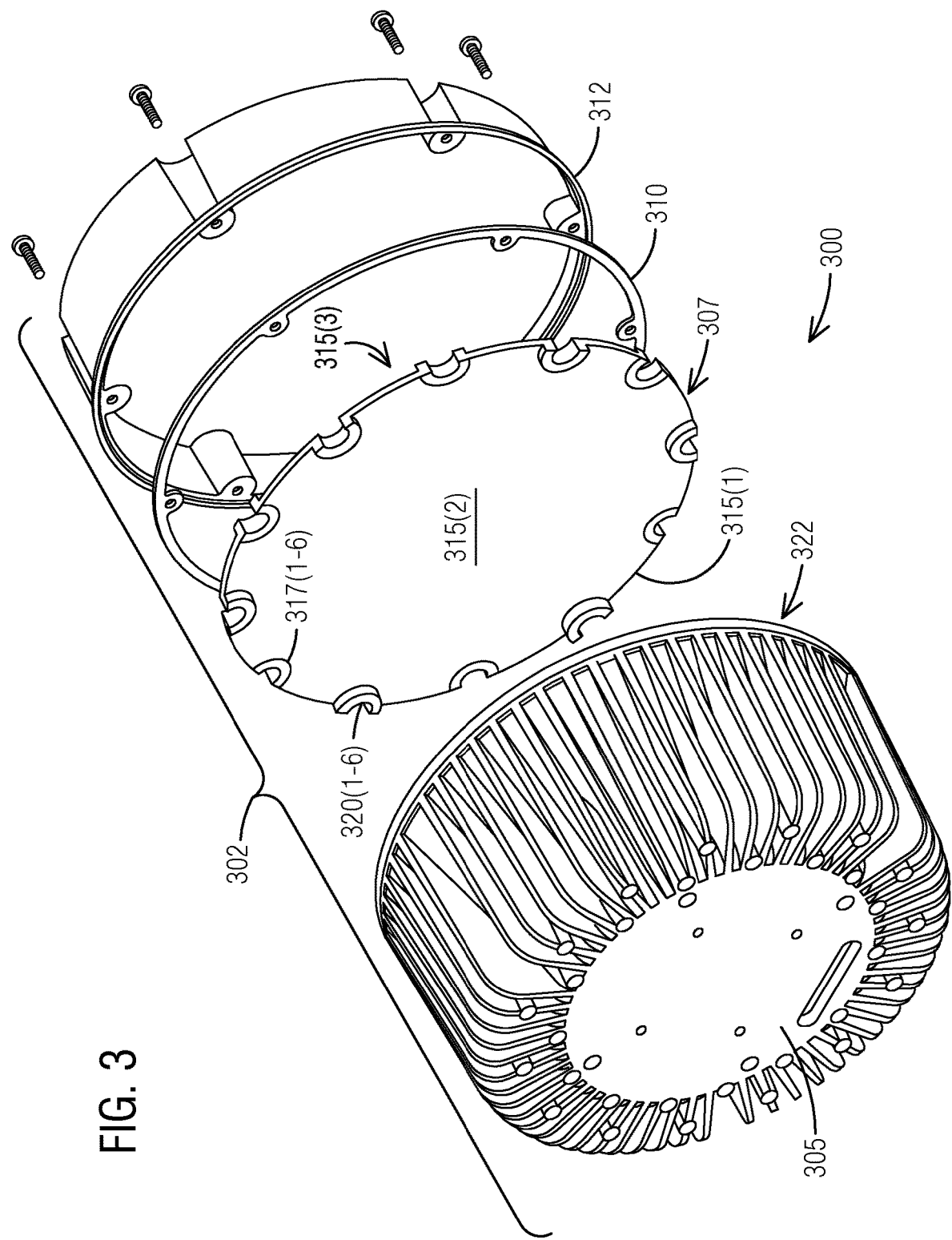
FIG. 3 illustrates a representation of a partial exploded rear view of a wayside signal light in accordance with an exemplary embodiment of the present invention.

Turning now to FIG. 3, it illustrates a representation of an exploded rear view of a wayside signal light 300 in accordance with an exemplary embodiment of the present invention. The wayside signal light 300 includes a signal light assembly 302 that includes a common housing 305, a multi-position Fresnel lens 307, a common gasket 310 and a range specific cover 312. The signal light assembly 302 comprises the multi-position Fresnel lens 307 having a circumference 315(1), a first side 315(2) and a second side 315(3). The multi-position Fresnel lens 307 has a plurality of grooves which are configured to face outwardly away from a LED light source.

The multi-position Fresnel lens 307 includes near the circumference 315(1) a first plurality of flat pads 317(1-6) and a second plurality of raised pads 320(1-6) on the first side 315(2) of the multi-position Fresnel lens 307 such that a height differential between the first plurality of flat pads 317(1-6) and the second plurality of raised pads 320(1-6) corresponds to a first range operation (a certain distance the light signaling of the wayside signal light is operational for a first assembly setting) related to a first focal length or to a second range operation (a certain larger distance than the first range operation the light signaling of the wayside signal light is operational for a second assembly setting) related to a second focal length.

The first focal length of the multi-position Fresnel lens 307 is herein defined as a lateral distance between a lamp such as a LED of the wayside signal light 300 and the multi-position Fresnel lens 307 itself mounted in the common housing 305 of the wayside signal light 300 with the first assembly setting. The second focal length of the multi-position Fresnel lens 307 is herein defined as a lateral distance between a lamp such as a LED of the wayside signal light 300 and the multi-position Fresnel lens 307 itself mounted in the common housing 305 of the wayside signal light 300 with the second assembly setting.

The signal light assembly 302 comprises a main housing or the common housing 305 having an inner surface 322. The common housing 305 is configured to attach to the multi-position Fresnel lens 307 via the first plurality of flat pads 317(1-6) or the second plurality of raised pads 320(1-6). The inner surface 322 of the common housing 305 including a plurality of bosses 325(1-6) (seen in FIG. 4) configured to receive corresponding screws through either the first plurality of flat pads 317(1-6) or the second plurality of raised pads 320(1-6) such that the multi-position Fresnel lens 307 is used for a first position corresponding to the first range operation or for a second position corresponding to the second range operation based on the use of either the first plurality of flat pads 317(1-6) or the second plurality of raised pads 320(1-6) for assembly between the main housing and the multi-position Fresnel lens.

Figure 4:
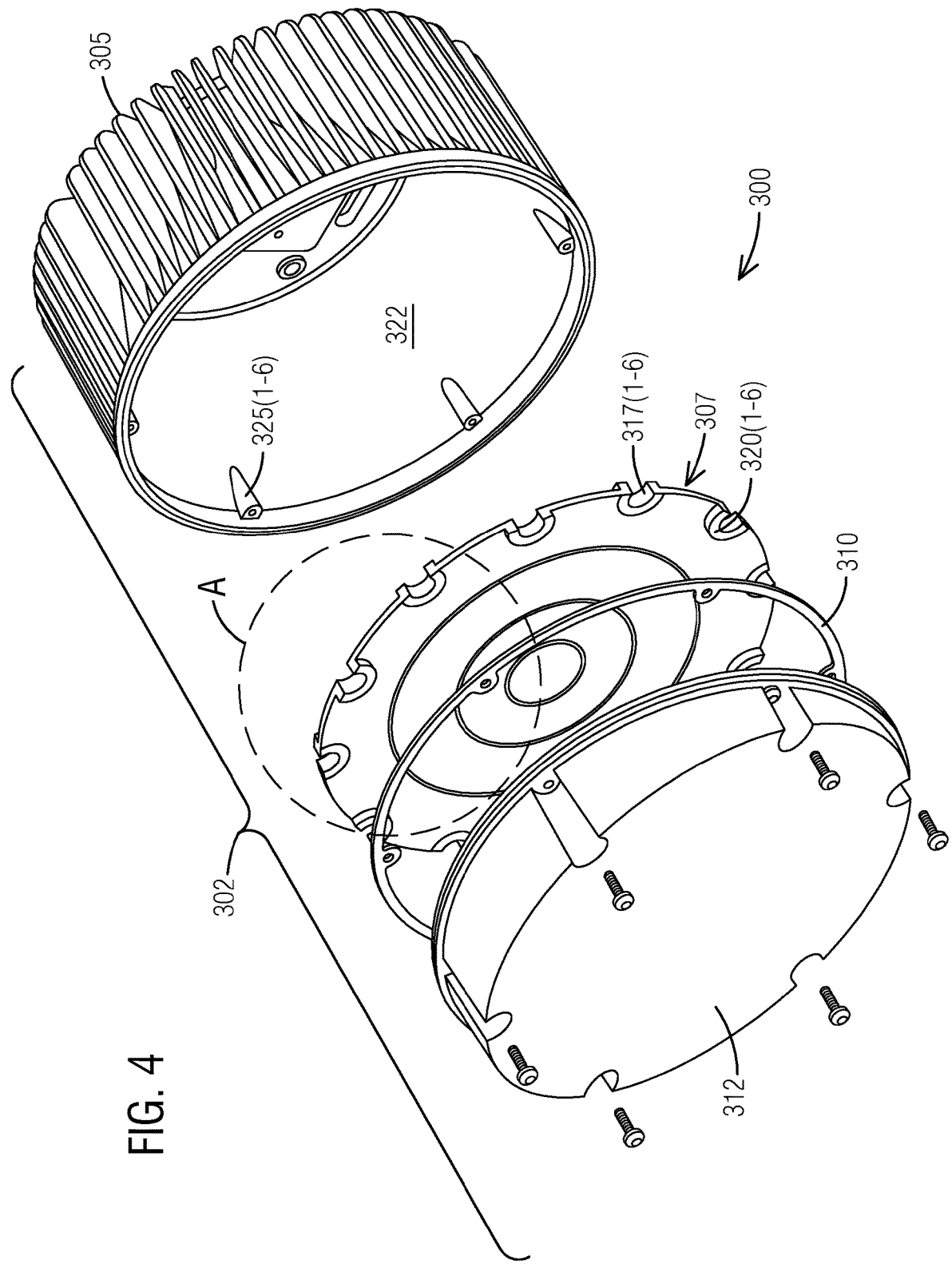
FIG. 4 illustrates a representation of a partial exploded front view of a wayside signal light in accordance with an exemplary embodiment of the present invention.

FIG. 4 illustrates a representation of a partial exploded front view of the wayside signal light 300 in accordance with an exemplary embodiment of the present invention. In operation, by rotating the multi-position Fresnel lens 307 30 degrees, the back side of the either the first plurality of flat pads 317(1-6) or the second plurality of raised pads 320(1-6) sit on the plurality of bosses 325(1-6) in the common housing 305. This 30 degree shift moves the multi-position Fresnel lens 307 inward or outward between the first position and the second position, changing the focal length. More options can be added over the two mid and long range sighting distances.

Figure 5:
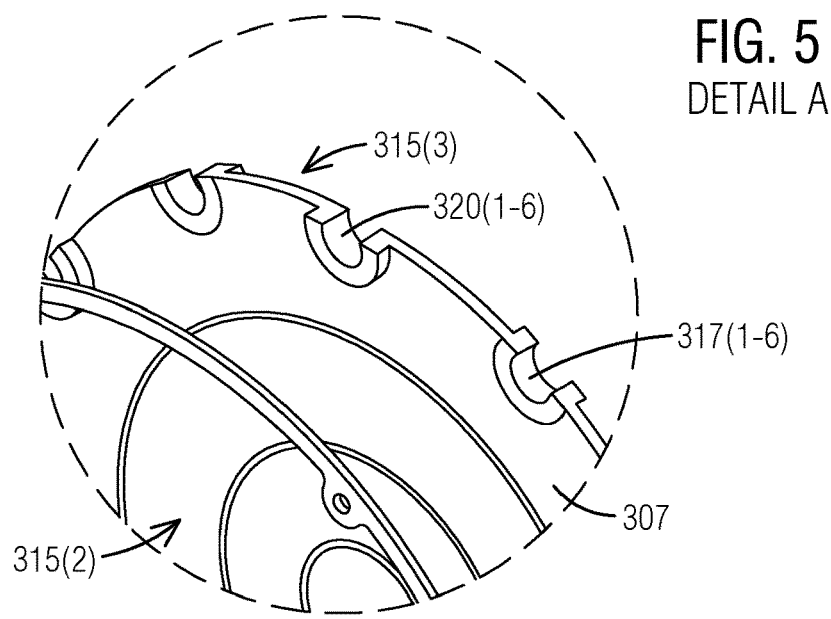
FIG. 5 illustrates a representation of a partial zoomed-in view of a Fresnel lens of a wayside signal light of FIG. 4 in accordance with an exemplary embodiment of the present invention.

As seen in FIG. 5, it illustrates a representation of a partial zoomed-in view of the multi-position Fresnel lens 307 of the wayside signal light 300 of FIG. 4 in accordance with an exemplary embodiment of the present invention. The first plurality of flat pads 317(1-6) situated on the first side 315(2) of the multi-position Fresnel lens 307 represent long range pads. The second plurality of raised pads 320(1-6) situated on the first side 315(2) of the multi-position Fresnel lens 307 represent mid range pads. The first side 315(2) of the multi-position Fresnel lens 307 is a Fresnel lens side as opposed to a flat side facing a lamp or a LED.

The signal light assembly 302 comprises the second side 315(3) of the multi-position Fresnel lens 307. The second side 315(3) of the multi-position Fresnel lens 307 sits on the common housing 305 such that the multi-position Fresnel lens 307 is configured to move forward relative to the common housing 305 by using the second plurality of raised pads 320(1-6). The multi-position Fresnel lens 307 is configured to be rotated to 30 degrees which moves the multi-position Fresnel lens 307 inward or outward while changing its focal length. The first plurality of flat pads 317(1-6) corresponds to a long range sighting distance and the first focal length. The second plurality of raised pads 320(1-6) corresponds to a mid range sighting distance and the second focal length. The first plurality of flat pads 317(1-6) include first six standoffs protruding from a Fresnel side and are flat on a plane side. The second plurality of raised pads 320(1-6) includes second six standoffs at a 30 degree offset to other side standoffs and protruding from a flat side.

The multi-position Fresnel lens 307 may be mounted with six equally spaced screws in the common housing 305. The multi-position Fresnel lens 307 is designed with twelve equally spaced screw mounting positions such that six of the positions have a molded in long spacer or pad and the other six have a molded in short spacer or pad. During assembly of the signal light assembly 302, one common Fresnel lens, i.e., the multi-position Fresnel lens 307 can be used for mid and long range units simply by rotating the common Fresnel lens to rest in the common housing 305 either on the short spacers (pads) or the long spacers (pads) effectively changing the focal length without different parts.

Figure 6:
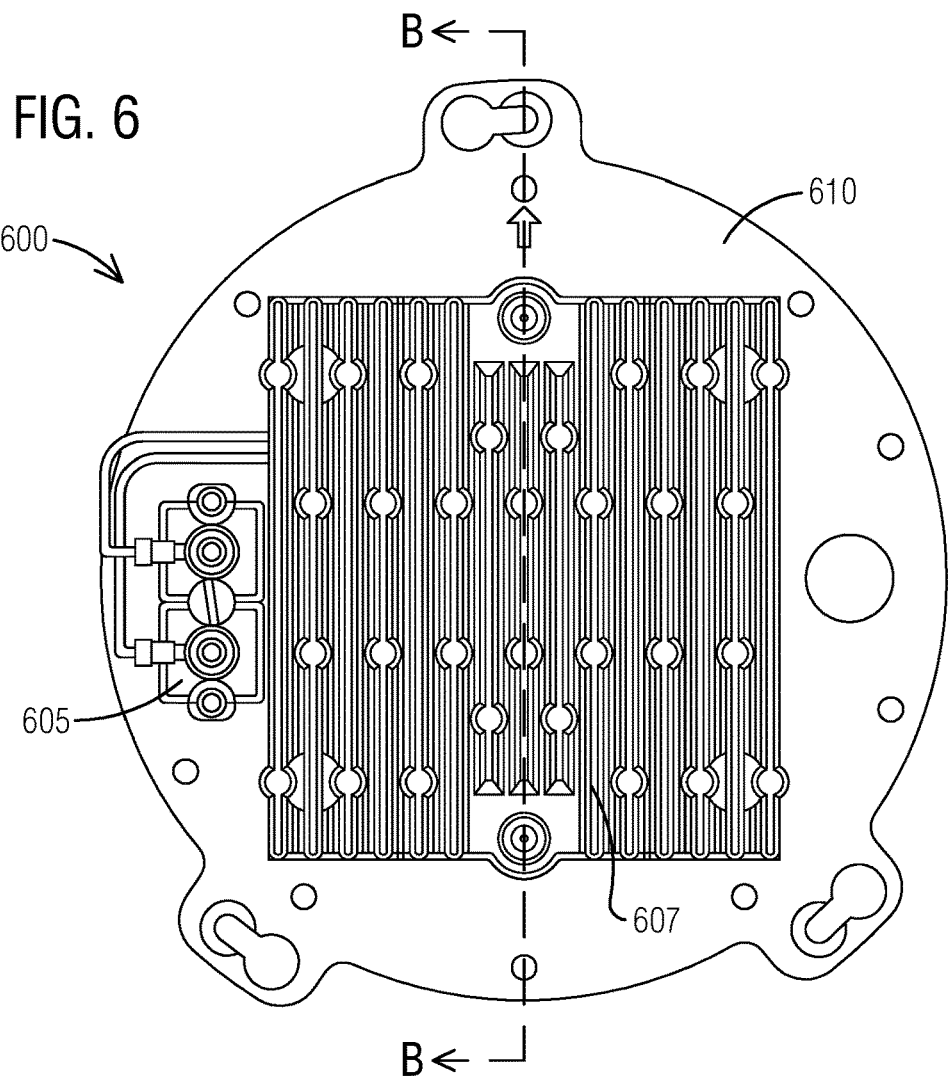
FIG. 6 illustrates a representation of a back view of a wayside signal light in accordance with an exemplary embodiment of the present invention.

As shown in FIG. 6, it illustrates a representation of a back view of a wayside signal light 600 in accordance with an exemplary embodiment of the present invention. The wayside signal light 600 includes a block terminal 605 next to a heat sink 607 for connecting a negative wire and a positive wire. Both the block terminal 605 being next to the heat sink 607 are mounted on a mounting ring 610.

Figure 7:
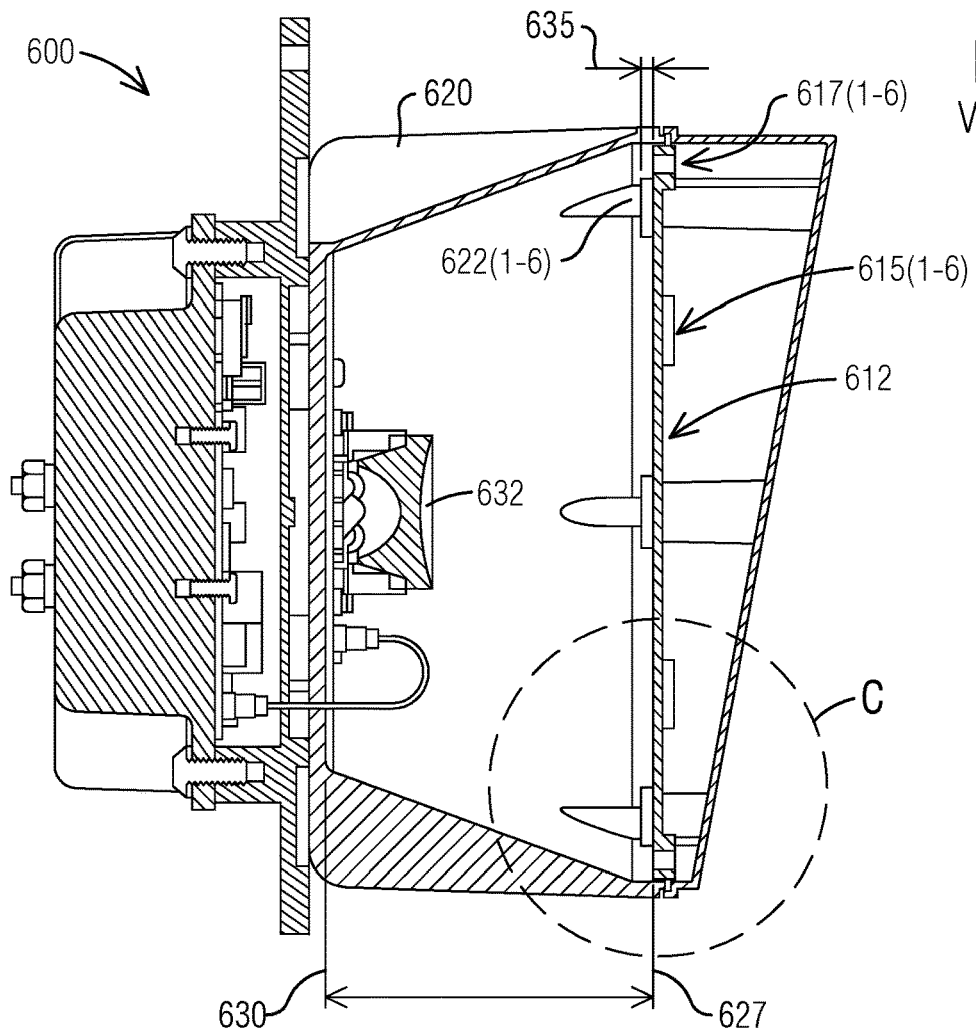
FIG. 7 illustrates a representation of a cross-sectional view of a wayside signal light shown in FIG. 6 along a line B-B in accordance with an exemplary embodiment of the present invention.

In FIG. 7, it illustrates a representation of a cross-sectional view of the wayside signal light 600 shown in FIG. 6 along a line B-B in accordance with an exemplary embodiment of the present invention. The wayside signal light 600 includes a dual position Fresnel lens 612 having a plurality of mid range pads 615(1-6) and a plurality of long range pads 617(1-6). The wayside signal light 600 further includes a main housing 620 having a plurality of contact surfaces 622(1-6) for the dual position Fresnel lens 612 at six places. In a long range assembly, the plurality of mid range pads 615(1-6) are not in use. However, if the dual position Fresnel lens 612 was installed 30 degrees rotated the plurality of long range pads 617(1-6) would hang in space. A focal length 625 of a long range configuration may be for example 3.25 inches. This focal length 625 is a distance between a back side 627 of the dual position Fresnel lens 612 and a plane 630 in which a lamp or a LED 632 is installed in the main housing 620. In one embodiment, a focal length difference 635 between a long range focal length and a mid range focal length may be 3.152" (0.098 inches is the difference in pad heights). For example, for a medium range assembly the color of signal light may be red.

Figure 8:
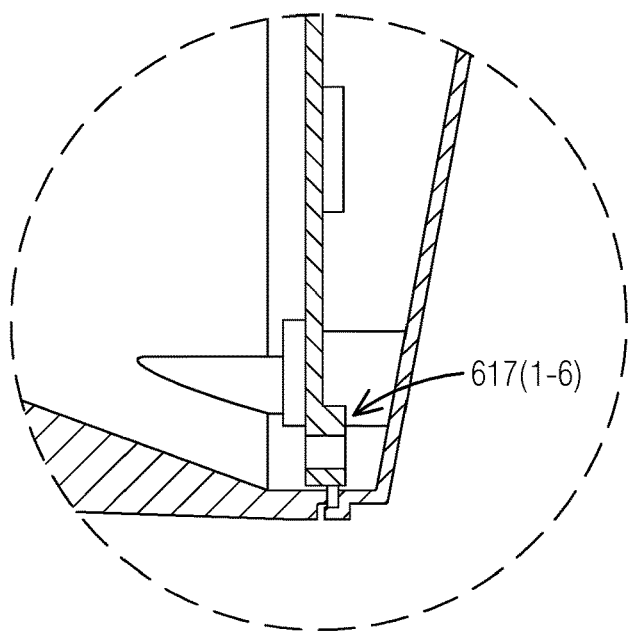
FIG. 8 illustrates a representation of a partial zoomed-in view of a Fresnel lens of a wayside signal light of FIG. 7 according to an exemplary embodiment of the present invention.

With regard to FIG. 8, it illustrates a representation of a partial zoomed-in view of the dual position Fresnel lens 612 of the wayside signal light 600 of FIG. 7 according to an exemplary embodiment of the present invention. In this long range assembly, the plurality of long range pads 617(1-6) are in use. However, if the dual position Fresnel lens 612 was installed 30 degrees rotated the plurality of long range pads 617(1-6) would not be in use.

Figure 9:
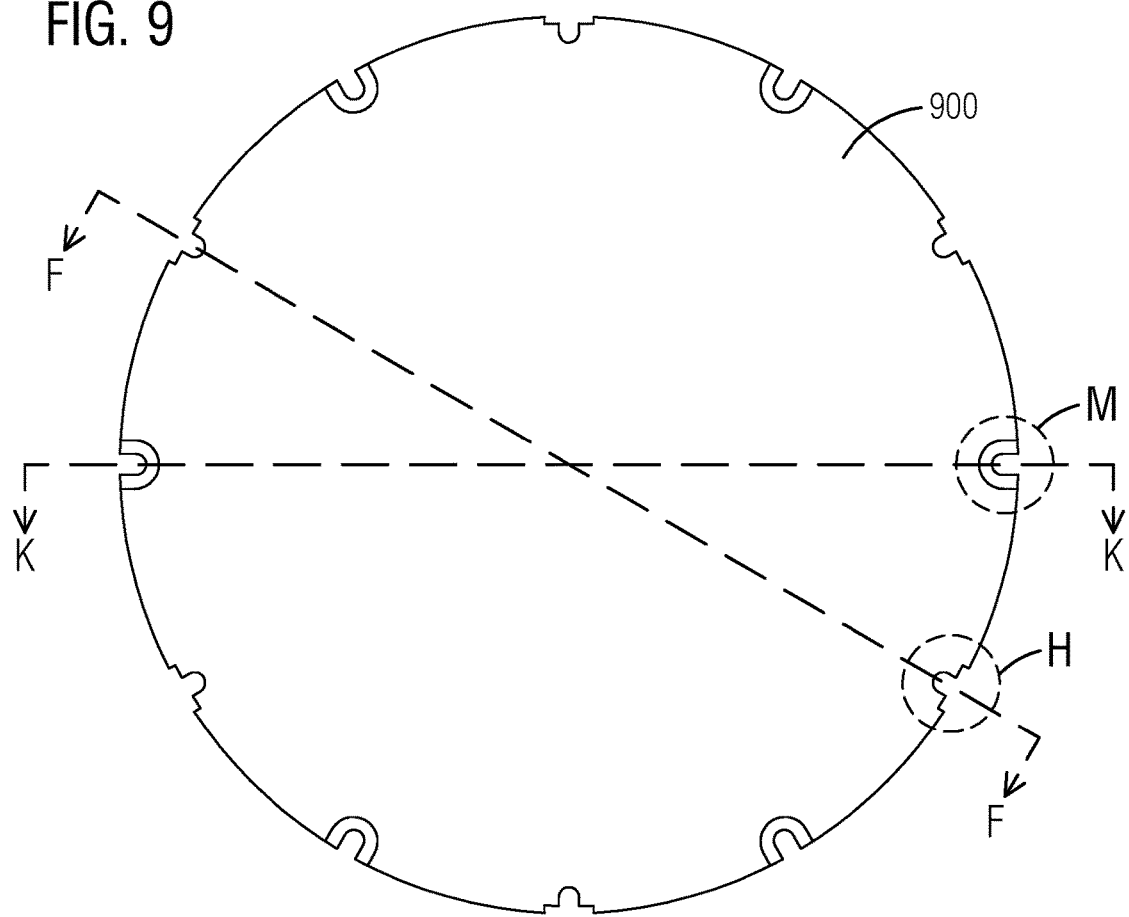
FIG. 9 illustrates a representation of a top view of a Fresnel lens of a wayside signal light in accordance to one exemplary embodiment of the present invention.

With respect to FIG. 9, it illustrates a representation of a top view of a Fresnel lens 900 of a wayside signal light in accordance to one exemplary embodiment of the present invention. The Fresnel lens 900 may be a dual position lens that is molded and have a constant groove depth. The Fresnel lens 900 may include six first standoffs (pads) 60 degree apart protruding from a Fresnel side and include six second standoffs (pads) 60 degree apart but at 30 degree radial offset to other side of the six first standoffs (pads) and protruding from a flat side of the Fresnel lens 900.

Figure 10:
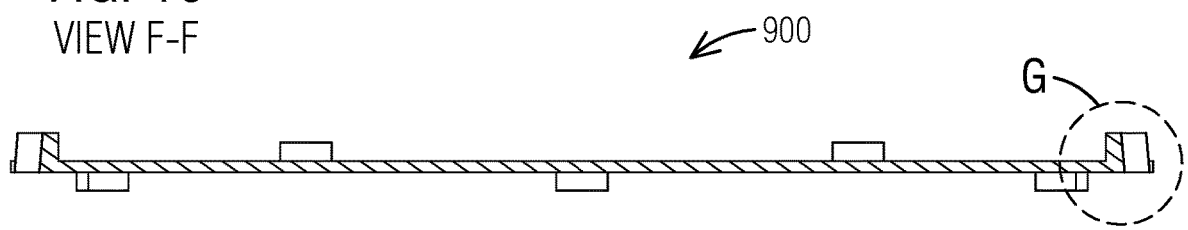
FIG. 10 illustrates a representation of a cross-sectional view of a Fresnel lens of a wayside signal light shown in FIG. 9 along a line F-F with six standoffs protruding from a Fresnel side and being having a flat surface on a plane side consistent with an illustrative embodiment of the instant invention.
Figure 11:
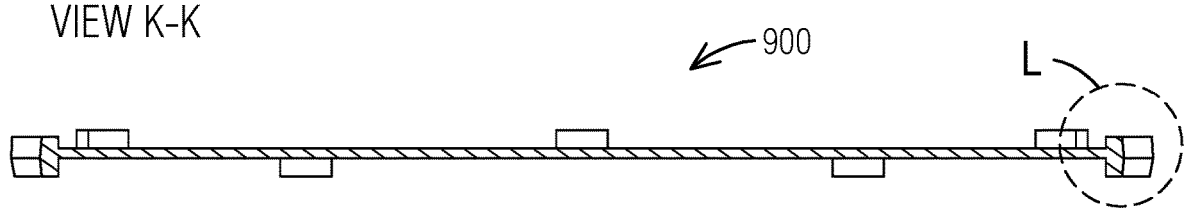
FIG. 11 shows a representation of a cross-sectional view of a Fresnel lens of a wayside signal light shown in FIG. 9 along a line K-K with six standoffs at 30 degree offset to other side standoffs which are protruding from a flat side of a Fresnel lens consistent with an illustrative embodiment of the present invention.

FIG. 10 illustrates a representation of a cross-sectional view of the Fresnel lens 900 of the wayside signal light shown in FIG. 9 along a line F-F with the six first standoffs protruding from the Fresnel side and being having a flat surface on a plane side consistent with an illustrative embodiment of the instant invention. FIG. 11 shows a representation of a cross-sectional view of the Fresnel lens 900 of the wayside signal light shown in FIG. 9 along a line K-K with the six second standoffs at 30 degree offset to other side standoffs which are protruding from the flat side of the Fresnel lens 900 consistent with an illustrative embodiment of the present invention.

Figure 12:
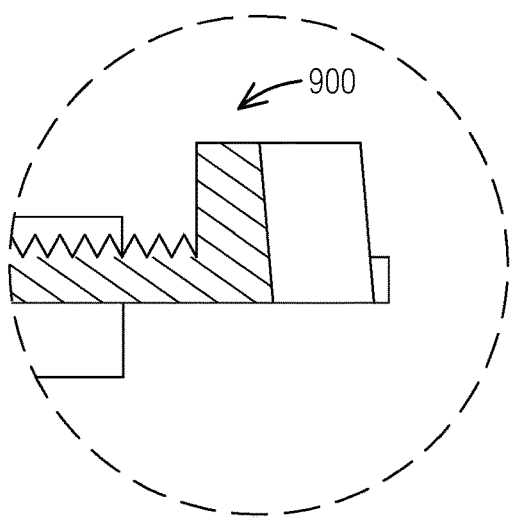
FIG. 12 depicts a representation of a partial cross-sectional, zoomed-in view of a Fresnel lens of a wayside signal light shown in FIG. 10 for detail G consistent with an illustrative embodiment of the present invention.
Figure 13:
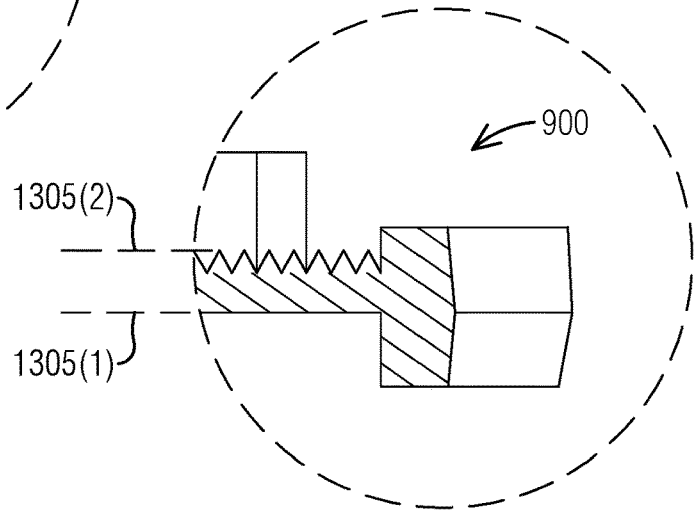
FIG. 13 depicts a representation of a partial cross-sectional, zoomed-in view of a Fresnel lens of a wayside signal light shown in FIG. 11 for detail L consistent with an illustrative embodiment of the present invention.

FIG. 12 depicts a representation of a partial cross-sectional, zoomed-in view of the Fresnel lens 900 of the wayside signal light shown in FIG. 10 for detail G consistent with an illustrative embodiment of the present invention. FIG. 13 depicts a representation of a partial cross-sectional, zoomed-in view of the Fresnel lens 900 of the wayside signal light shown in FIG. 11 for detail L consistent with an illustrative embodiment of the present invention. A reference plane A 1305(1) is a flat side of the Fresnel lens 900. A reference plane B 1305(2) is a lens side of the Fresnel lens 900. For example, the reference plane B 1305(2) may be 0.098" offset plane from the reference plane A 1305(1).

Figure 14:
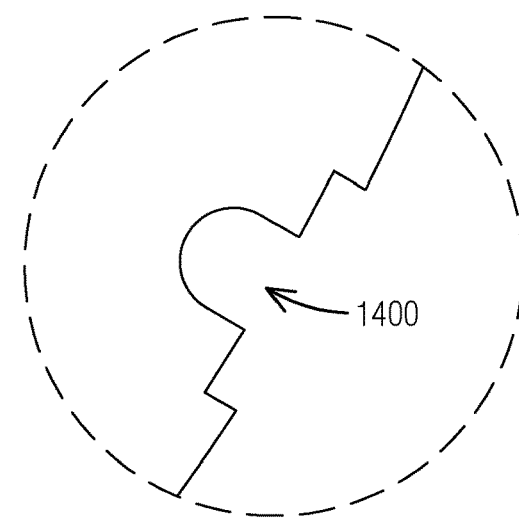
FIG. 14 depicts a representation of a partial zoomed-in view of a Fresnel lens of a wayside signal light shown in FIG. 9 for detail H consistent with an illustrative embodiment of the present invention.
Figure 15:
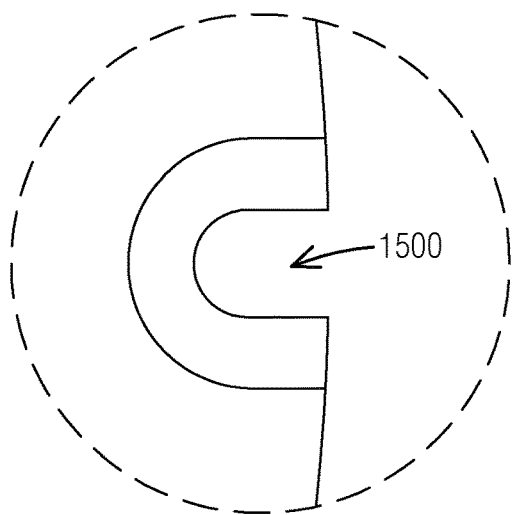
FIG. 15 depicts a representation of a partial zoomed-in view of a Fresnel lens of a wayside signal light shown in FIG. 9 for detail M consistent with an illustrative embodiment of the present invention.

FIG. 14 depicts a representation of a partial zoomed-in view of the Fresnel lens 900 of the wayside signal light shown in FIG. 9 for detail H consistent with an illustrative embodiment of the present invention. In particular, FIG. 14 shows a flat pad 1400 of the Fresnel lens 900. FIG. 15 depicts a representation of a partial zoomed-in view of the Fresnel lens 900 of the wayside signal light shown in FIG. 9 for detail M consistent with an illustrative embodiment of the present invention. In particular, FIG. 15 shows a raised pad 1500 of the Fresnel lens 900.

FIG. 16 schematically represents a side view of a Fresnel lens 1600 of a wayside signal light consistent with an exemplary embodiment of the present invention. The Fresnel lens 1600 reduces the amount of material required compared to a conventional lens by dividing the lens into a set of concentric annular sections. An ideal Fresnel lens would have an infinite number of sections. In each section, the overall thickness is decreased compared to an equivalent simple lens. This effectively divides the continuous surface of a standard lens into a set of surfaces of the same curvature, with stepwise discontinuities between them. In some lenses, the curved surfaces are replaced with flat surfaces, with a different angle in each section. Such a lens can be regarded as an array of prisms arranged in a circular fashion, with steeper prisms on the edges, and a flat or slightly convex center. The Fresnel lens 1600 is usually made of glass or plastic.

FIG. 17 depicts a representation of a partial zoomed-in view of the Fresnel lens 1600 of the wayside signal light shown in FIG. 16 for detail B consistent with an illustrative embodiment of the present invention. The Fresnel lens 1600 comprises an array of prisms 1705 arranged in a circular fashion and a slightly convex center 1710.

FIG. 18 depicts a representation of a partial zoomed-in view of the Fresnel lens 1600 of the wayside signal light shown in FIG. 16 for detail C consistent with an illustrative embodiment of the present invention. The Fresnel lens 1600 comprises an array of steeper prisms 1805 on the edges.

Figure 19:
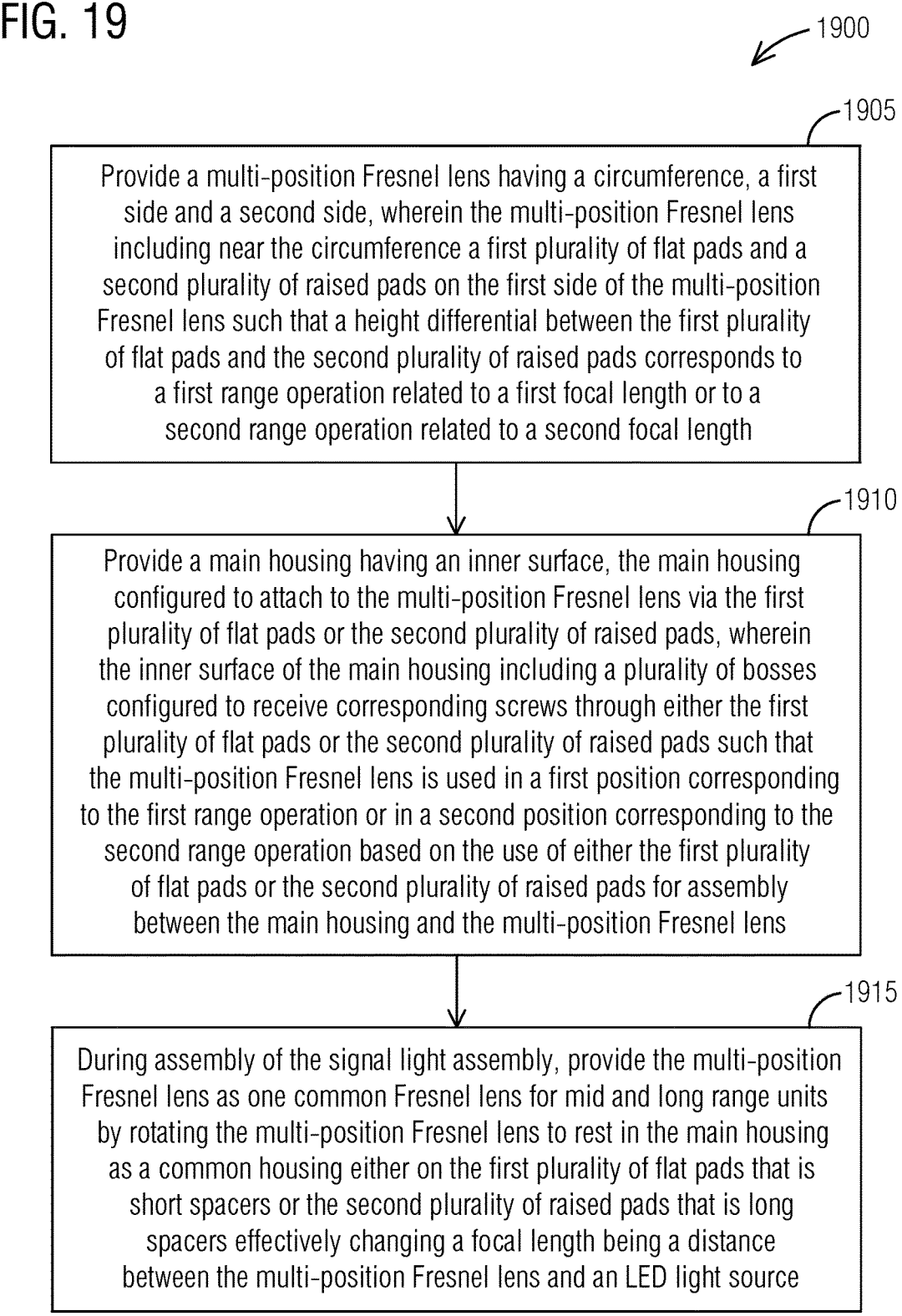
FIG. 19 illustrates a flow chart of a method for configuring a signal light assembly according to one exemplary embodiment of the present invention.

FIG. 19 illustrates a flow chart of a method 1900 for configuring a signal light assembly according to one exemplary embodiment of the present invention. Reference is made to the elements and features described in FIGS. 1-18. It should be appreciated that some steps are not required to be performed in any particular order, and that some steps are optional.

In step 1905, the method 1900 includes providing a multi-position Fresnel lens having a circumference, a first side and a second side. The multi-position Fresnel lens includes near the circumference a first plurality of flat pads and a second plurality of raised pads on the first side of the multi-position Fresnel lens such that a height differential between the first plurality of flat pads and the second plurality of raised pads corresponds to a first range operation related to a first focal length or to a second range operation related to a second focal length.

In step 1910, the method 1900 includes providing a main housing having an inner surface. The main housing is configured to attach to the multi-position Fresnel lens via the first plurality of flat pads or the second plurality of raised pads. The inner surface of the main housing including a plurality of bosses configured to receive corresponding screws through either the first plurality of flat pads or the second plurality of raised pads such that the multi-position Fresnel lens is used for a first position corresponding to the first range operation or for a second position corresponding to the second range operation based on the use of either the first plurality of flat pads or the second plurality of raised pads for assembly between the main housing and the multi-position Fresnel lens.

In step 1915, the method 1900 includes, during assembly of the signal light assembly, providing the multi-position Fresnel lens as one common Fresnel lens for mid and long range units by rotating the multi-position Fresnel lens to rest in the main housing as a common housing either on the first plurality of flat pads that is short spacers or the second plurality of raised pads that is long spacers effectively changing a focal length being a distance between the multi-position Fresnel lens and a LED light source.

While a single Fresnel lens is described here a range of one or more other types of lenses or other forms of optics are also contemplated by the present invention. For example, other types of refractive lenses or other lenses of a large aperture and a short focal length without the mass and volume of material may be implemented based on one or more features presented above without deviating from the spirit of the present invention.

The techniques described herein can be particularly useful for a signal light assembly of a wayside signal light such as a 8" color light, e.g., a red color light. While particular embodiments are described in terms of the signal light assembly, the techniques described herein are not limited to the signal light assembly but can also be used with other light assemblies.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A signal light assembly comprising:
a multi-position Fresnel lens having a circumference, a first side and a second side,
wherein the multi-position Fresnel lens includes a first plurality of pads and a second plurality of pads on the first side of the multi-position Fresnel lens such that the first plurality of pads and the second plurality of pads are different and alternatively disposed,
wherein the first plurality of pads corresponds to a first range operation related to a first focal length, and
wherein the second plurality of pads corresponds to a second range operation related to a second focal length; and
a main housing configured to attach to the multi-position Fresnel lens,
wherein the multi-position Fresnel lens is disposed in a first position corresponding to the first range operation or in a second position corresponding to the second range operation based on the use of either the first plurality of pads or the second plurality of pads for assembly between the main housing and the multi-position Fresnel lens.

2. The assembly of claim 1, wherein the second side of the multi-position Fresnel lens sits on the main housing such that the multi-position Fresnel lens is configured to move forward relative to the main housing by using the second plurality of pads.

3. The assembly of claim 1, wherein the multi-position Fresnel lens is configured to be rotated to 30 degrees which moves the multi-position Fresnel lens inward or outward while changing a focal length.

4. A wayside signal light comprising:
a signal light assembly including:
a multi-position Fresnel lens having a circumference, a first side and a second side,
wherein the multi-position Fresnel lens includes near the circumference a first plurality of flat pads and a second plurality of raised pads on the first side of the multi-position Fresnel lens such that a height differential between the first plurality of flat pads and the second plurality of raised pads corresponds to a first range operation related to a first focal length or to a second range operation related to a second focal length; and a main housing having an inner surface, the main housing configured to attach to the multi-position Fresnel lens via the first plurality of flat pads or the second plurality of raised pads,
wherein the inner surface of the main housing includes a plurality of bosses configured to receive corresponding screws through either the first plurality of flat pads or the second plurality of raised pads such that the multi-position Fresnel lens is used in a first position corresponding to the first range operation or in a second position corresponding to the second range operation based on the use of either the first plurality of flat pads or the second plurality of raised pads for assembly between the main housing and the multi-position Fresnel lens.

5. The wayside signal light of claim 4, wherein the second side of the multi-position Fresnel lens sits on the main housing such that the multi-position Fresnel lens is configured to move forward relative to the main housing by using the second plurality of raised pads.

6. The wayside signal light of claim 4, wherein the multi-position Fresnel lens is configured to be rotated to 30 degrees which moves the multi-position Fresnel lens inward or outward while changing a focal length.

7. The wayside signal light of claim 4, wherein the first plurality of flat pads corresponds to a long range sighting distance.

8. The wayside signal light of claim 4, wherein the second plurality of raised pads corresponds to a mid range sighting distance.

9. The wayside signal light of claim 4, wherein the first plurality of flat pads corresponds to the first focal length.

10. The wayside signal light of claim 4, wherein the second plurality of raised pads corresponds to the second focal length.

11. The wayside signal light of claim 4, wherein the first plurality of flat pads include first six standoffs protruding from a Fresnel side and are flat on a plane side.

12. The wayside signal light of claim 11, wherein the second plurality of raised pads includes second six standoffs at a 30 degree offset to other side standoffs and protruding from a flat side.

13. The wayside signal light of claim 4, wherein the multi-position Fresnel lens having a plurality of grooves which are configured to face outwardly away from a LED light source.

14. A method for configuring a signal light assembly, the method comprising:
providing a multi-position Fresnel lens having a circumference, a first side and a second side, wherein the multi-position Fresnel lens includes near the circumference a first plurality of flat pads and a second plurality of raised pads on the first side of the multi-position Fresnel lens such that a height differential between the first plurality of flat pads and the second plurality of raised pads corresponds to a first range operation related to a first focal length or to a second range operation related to a second focal length;
providing a main housing having an inner surface, the main housing configured to attach to the multi-position Fresnel lens via the first plurality of flat pads or the second plurality of raised pads, wherein the inner surface of the main housing includes a plurality of bosses configured to receive corresponding screws through either the first plurality of flat pads or the second plurality of raised pads such that the multi-position Fresnel lens is used in a first position corresponding to the first range operation or in a second position corresponding to the second range operation based on the use of either the first plurality of flat pads or the second plurality of raised pads for assembly between the main housing and the multi-position Fresnel lens; and during assembly of the signal light assembly, providing the multi-position Fresnel lens as one common Fresnel lens for mid and long range units by rotating the multi-position Fresnel lens to rest in the main housing as a common housing either on the first plurality of flat pads that is short spacers or the second plurality of raised pads that is long spacers effectively changing a focal length being a distance between the multi-position Fresnel lens and a LED light source.

15. The method of claim 14, wherein the second side of the multi-position Fresnel lens sits on the main housing such that the multi-position Fresnel lens is configured to move forward the multi-position Fresnel lens relative to the main housing by using the second plurality of raised pads.

16. The method of claim 14, wherein the multi-position Fresnel lens is configured to be rotated to 30 degrees which moves the multi-position Fresnel lens inward or outward while changing a focal length.

17. The method of claim 14, wherein the first plurality of flat pads corresponds to a long range sighting distance and wherein the second plurality of raised pads corresponds to a mid range sighting distance.

18. The method of claim 14, wherein the first plurality of flat pads corresponds to the first focal length and wherein the second plurality of raised pads corresponds to the second focal length.

19. The method of claim 14, wherein the first plurality of flat pads include first six standoffs protruding from a Fresnel side and are flat on a plane side and wherein the second plurality of raised pads includes second six standoffs at a 30 degree offset to other side standoffs and protruding from a flat side.

20. The method of claim 14, wherein the multi-position Fresnel lens having a plurality of grooves which are configured to face outwardly away from the LED light source.

* * * * *